United States Patent
Xu et al.

(10) Patent No.: US 12,421,133 B2
(45) Date of Patent: Sep. 23, 2025

(54) PREPARATION METHOD FOR 2-4 MICROMETERS BATTERY-GRADE COBALT TETROXIDE

(71) Applicant: GEM (Jiangsu) Cobalt Industry Co., Ltd., Jiangsu (CN)

(72) Inventors: Kaihua Xu, Jiangsu (CN); Zhenkang Jiang, Jiangsu (CN); Aiqing Zhang, Jiangsu (CN); Bingzhong Li, Jiangsu (CN); Chao Wang, Jiangsu (CN); Dongwei Xu, Jiangsu (CN); Qiyong Shi, Jiangsu (CN); Fan Bi, Jiangsu (CN); Chao Ning, Jiangsu (CN)

(73) Assignee: GEM (Jiangsu) Cobalt Industry Co., Ltd., Taizhou (CN)

( * ) Notice: Subject to any disclaimer, the term of this patent is extended or adjusted under 35 U.S.C. 154(b) by 615 days.

(21) Appl. No.: 17/842,817

(22) Filed: Jun. 17, 2022

(65) Prior Publication Data
US 2022/0315445 A1 Oct. 6, 2022

Related U.S. Application Data

(63) Continuation of application No. PCT/CN2019/126928, filed on Dec. 20, 2019.

(30) Foreign Application Priority Data

Dec. 19, 2019 (CN) .......................... 201911319087.8

(51) Int. Cl.
*C01G 51/04* (2025.01)
(52) U.S. Cl.
CPC .......... *C01G 51/04* (2013.01); *C01P 2004/03* (2013.01); *C01P 2006/11* (2013.01); *C01P 2006/12* (2013.01)

(58) Field of Classification Search
CPC .............. C01P 2004/61; C01P 2004/03; C01P 2006/11; C01P 2006/12; Y02E 60/10; C01G 51/04; H01M 4/525
See application file for complete search history.

(56) References Cited

FOREIGN PATENT DOCUMENTS

| CN | 101508471 A | 8/2009 |
|----|-------------|--------|
| CN | 103359794 A | 10/2013 |

(Continued)

OTHER PUBLICATIONS

English Translation of CN 104716303 A (Year: 2015).*

(Continued)

*Primary Examiner* — Paul A Wartalowicz
*Assistant Examiner* — Slone Elizabeth Simkins
(74) *Attorney, Agent, or Firm* — Hemisphere Law, PLLC; Zhigang Ma

(57) ABSTRACT

The present invention discloses a preparation method for 2-4 μm battery-grade cobalt tetroxide, comprises following steps: 1) adding a cobalt salt solution and an alkaline solution by parallel flows to a reactor with a base solution and an air flow, controlling pH value of a system by adjusting flow rate of the alkaline solution for coprecipitation reaction at a certain stirring rate, decreasing the pH value of the reaction system and increasing flow rate of the cobalt salt solution after the reaction solutions begin to overflow; 2) aging and drying the cobalt oxyhydroxide slurry in sequence; 3) calcining the dried cobalt oxyhydroxide. By adopting this method, tap density of the battery-grade cobalt tetroxide obtained is much higher than that of cobalt tetroxide with a same particle size specification prepared by the prior art.

15 Claims, 2 Drawing Sheets

(56) References Cited

FOREIGN PATENT DOCUMENTS

| CN | 103715418 | A |   | 4/2014  |              |
|----|-----------|---|---|---------|--------------|
| CN | 103833088 | A |   | 6/2014  |              |
| CN | 104716303 | A | * | 6/2015  |              |
| CN | 106784800 | A |   | 5/2017  |              |
| CN | 108862404 | A |   | 11/2018 |              |
| CN | 109368709 | A |   | 2/2019  |              |
| CN | 109942030 | A |   | 6/2019  |              |
| CN | 110255629 | A | * | 9/2019  | ...... C01G 51/04 |
| CN | 112850803 | A | * | 5/2021  |              |
| CN | 112850807 | A | * | 5/2021  | ...... C01G 53/44 |
| EP | 2314545   | A1 |  | 4/2011  |              |

OTHER PUBLICATIONS

English Translation of CN 103359794 A Claims (Year: 2013).*
English Translation of CN 103359794 A Description (Year: 2013).*
English Translation of CN 112850803 A (Year: 2021).*
English Translation of CN 106784800 A (Year: 2017).*
English Translation of CN 109942030 A (Year: 2019).*
English Translation of CN 110255629 A (Year: 2019).*
English Translation of CN 112850807 A (Year: 2021).*
International Search Report of PCT Patent Application No. PCT/CN2019/126928 issued on Sep. 23, 2020.

* cited by examiner

PREPARATION METHOD FOR 2-4 MICROMETERS BATTERY-GRADE COBALT TETROXIDE

CROSS-REFERENCE TO RELATED APPLICATION

The present application is a continuation application of PCT application No. PCT/CN2019/126928 filed on Dec. 20, 2019, which claims the benefit of Chinese Patent Application No. 201911319087.8 filed on Dec. 19, 2019, each of which is incorporated by reference herein in its entirety.

FIELD OF INVENTION

The present invention belongs to the technical field of cobalt tetroxide, and particularly relates to a preparation method for 2-4 μm battery-grade cobalt tetroxide.

BACKGROUND ART OF THE INVENTION

Generally speaking, lithium cobalt oxide battery material need to be made by mixing and matching large and small particles of cobalt tetroxide, in order to improve the overall performance of the lithium cobalt oxide battery material, so the cobalt tetroxide need to have a higher tap density and a larger specific surface area.

In the current field of battery material manufacturing, a preparation method for battery-grade cobalt tetroxide is mainly to prepare large particles of cobalt carbonate with a particle size of 10-20 μm by reaction between ammonium bicarbonate and cobalt sulfate solution, and then sinter the cobalt carbonate to release $CO_2$ therein, thus obtaining cobalt tetroxide with a desired particle size. The cobalt tetroxide prepared by this method has a low tap density which is only about 2.2 g/cm$^3$, and the cobalt carbonate is easy to have a phenomenon of particle bursting in the process of sintering. The reason is that: the content of cobalt in the cobalt carbonate is only 49.6%, and other components are carbonates, so a large amount of carbon dioxide gas will be released in the process of sintering; if the carbon dioxide is released too fast, particle bursting will be caused, resulting in poor consistency of a product and more fine particles, thus affecting various performances of a battery. Therefore, sintering temperature shall be strictly controlled not to change too fast.

DISCLOSURE OF THE INVENTION

In view of this, the present application provides a preparation method for 2-4 μm battery-grade cobalt tetroxide, which solves the problems of a core-shell structure precursor prepared in the prior art that the precursor has a structure which is loose inside and dense outside, the precursor of such structure results in uneven distribution of Li during subsequent mixing with Li for calcination and requires a higher calcination temperature, and a structure formed after calcination has poor stability, therefore affecting electrochemical performances of a positive electrode material.

To achieve the above purpose, the technical solution of the present invention is realized as follows: a preparation method for 2-4 μm battery-grade cobalt tetroxide, comprising the following steps:

Step 1: adding a cobalt salt solution and an alkaline solution by parallel flows at certain feed rates respectively to a reactor with a base solution and an air flow, controlling pH value of a system at 10-11 by adjusting flow rate of the alkaline solution for coprecipitation reaction at a certain stirring rate, decreasing the pH value of the reaction system by 0.1-0.2 per hour and increasing flow rate of the cobalt salt solution by 15-25 L/h after the reaction solutions begin to overflow until the pH value of the reaction system is decreased to 9.2-9.8 and the flow rate of the cobalt salt solution is increased to 320-360 L/h, continuously monitoring particle size, and stopping feeding when D50 reaches 2-4 μm, thus obtaining a cobalt oxyhydroxide slurry;

Step 2: aging, washing, de-ironing and drying the cobalt oxyhydroxide slurry obtained in step 1 in sequence, thus obtaining dried cobalt oxyhydroxide;

Step 3: calcining the dried cobalt oxyhydroxide obtained in step 2 through a low temperature zone and a high temperature zone in sequence, thus obtaining 2-4 μm battery-grade cobalt tetroxide.

Preferably, in step 1, concentration of the cobalt salt solution is 120-140 g/L, and concentration of the alkaline solution is 300-600 g/L.

Preferably, in step 1, the feed rate of the cobalt salt solution is 220-260 L/h; and the feed rate of the alkaline solution is 50-150 L/h.

Preferably, in step 1, the stirring rate is 150-350 r/min.

Preferably, in step 1, temperature of the coprecipitation reaction is 60-80° C.

Preferably, in step 1, the pH value of the reaction system is decreased by 0.1-0.2 per hour and the flow rate of the cobalt salt solution is increased by 15-25 L/h after the reaction solutions begin to overflow until the pH value of the reaction system is decreased to 9.2-9.8 and the flow rate of the cobalt salt solution is increased to 320-360 L/h.

Preferably, in step 1, the base solution is pure water.

Preferably, in step 3, the low temperature zone is 200-400° C.; and the high temperature zone is 600-800° C.

Compared with the prior art, and through the method of preparing cobalt oxyhydroxide by reaction among sodium hydroxide, air and the cobalt salt solution first and then calcining the prepared cobalt oxyhydroxide, the present invention makes tap density of the cobalt tetroxide finally obtained much higher than that of cobalt tetroxide prepared by the prior art; in addition, water molecules are released in the process of sintering the cobalt oxyhydroxide in the method of the present invention, and compared with the rigid molecules of carbon dioxide released in the prior art, the water molecules are flexible molecules, are not easy to have a phenomenon of particle bursting, are more favorable for the sintering of cobalt tetroxide, and will not cause environmental pollution; at the same time, electric power consumption in the process of sintering can be greatly reduced.

DETAILED DESCRIPTION OF THE INVENTION

Figure 1:
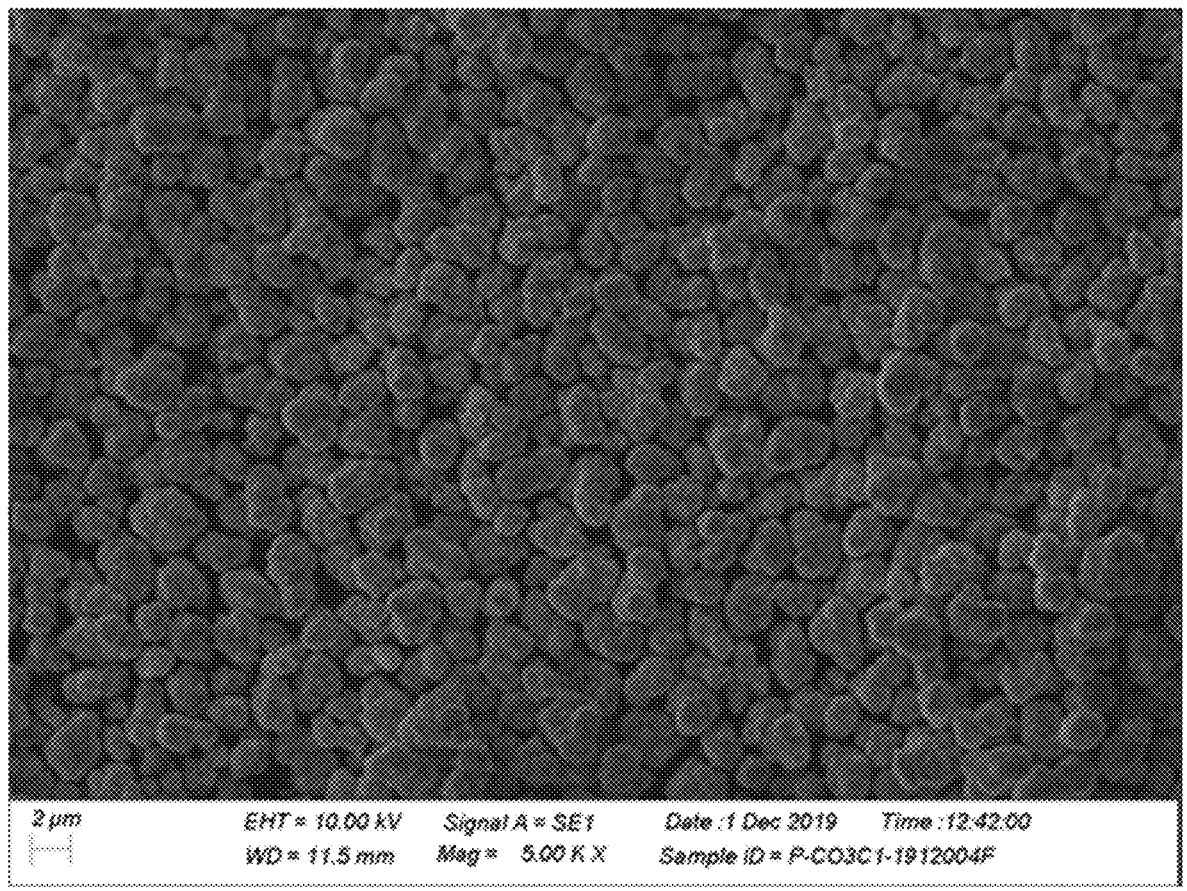
FIG. 1 is an SEM diagram of 2-4 μm battery-grade cobalt tetroxide obtained in embodiment 1 of the present invention.

To make the purpose, the technical solution and the advantages of the present invention more clear, the present invention will be further described below in detail in combination with specific embodiments. It should be understood that the specific embodiments described herein are only used for explaining the present invention, not used for limiting the present invention.

The present invention uses a laser particle size analyzer to measure the particle size in the process of generating cobalt tetroxide and the particle size of cobalt tetroxide finally obtained, and chemical reagents used in embodiments of the present invention are obtained through conventional commercial channels unless otherwise specified.

A preparation method for 2-4 μm battery-grade cobalt tetroxide provided by embodiments of the present invention, comprising the following steps:

Step 1: adding a cobalt salt solution with a cobalt ion concentration of 120-140 g/L and an alkaline solution with a concentration of 300-600 g/L by parallel flows at feed rates of 220-260 L/h and 50-150 L/h respectively to a reactor with pure water and an air flow, controlling pH value of a system at 10-11 by adjusting flow rate of the alkaline solution for coprecipitation reaction at a temperature of 65-80° C. and a stirring rate of 150-350 r/min, decreasing the pH value of the reaction system by 0.1-0.2 per hour and increasing flow rate of the cobalt salt solution by 15-25 L/h after the reaction solutions begin to overflow until the pH value of the reaction system is decreased to 9.2-9.8 and the flow rate of the cobalt salt solution is increased to 320-360 L/h, continuously monitoring particle size, and stopping feeding when D50 reaches a desired value, thus obtaining a cobalt oxyhydroxide slurry;

Wherein cobalt salt is at least one of cobalt chloride, cobalt sulfate and cobalt nitrate, preferably cobalt sulfate;

Step 2: aging, washing, de-ironing and drying the cobalt oxyhydroxide slurry obtained in step 1 in sequence, thus obtaining dried cobalt oxyhydroxide;

Step 3: calcining the dried cobalt oxyhydroxide obtained in step 2 through a low temperature zone of 200-400° C. and a high temperature zone of 700-800° C. in sequence, thus obtaining 2-4 μm battery-grade cobalt tetroxide.

After the above solution is adopted, and through the method of preparing cobalt oxyhydroxide by reaction among sodium hydroxide, air and the cobalt salt solution first and then calcining the prepared cobalt oxyhydroxide, the present invention makes tap density of the cobalt tetroxide finally obtained much higher than that of cobalt tetroxide prepared by the prior art; in addition, water molecules are released in the process of sintering the cobalt oxyhydroxide in the method of the present invention, and compared with the rigid molecules of carbon dioxide released in the prior art, the water molecules are flexible molecules, are not easy to have a phenomenon of particle bursting, are more favorable for the sintering of cobalt tetroxide, and will not cause environmental pollution; at the same time, electric power consumption in the process of sintering can be greatly reduced.

To better explain the technical solution of the present invention, the present invention is further described below in combination with specific embodiments.

Embodiment 1

2-4 μm battery-grade cobalt tetroxide provided by embodiment 1 of the present invention is prepared by the following steps:

Step 1: adding a cobalt sulfate solution with a cobalt ion concentration of 130 g/L and an alkaline solution with a concentration of 450 g/L by parallel flows at feed rates of 240 L/h and 100 L/h respectively to a reactor with pure water and an air flow, controlling pH value of a system at 10.3 by adjusting flow rate of the alkaline solution for coprecipitation reaction at a temperature of 70° C. and a stirring rate of 200 r/min, decreasing the pH value of the reaction system by 0.1 per hour and increasing flow rate of the cobalt salt solution by 20 L/h after the reaction solutions begin to overflow until the pH value of the reaction system is decreased to 9.5 and the flow rate of the cobalt salt solution is increased to 340 L/h, continuously monitoring particle size, and stopping feeding when D50 reaches a desired value, thus obtaining a cobalt oxyhydroxide slurry;

Step 2: aging, washing, de-ironing and drying the cobalt oxyhydroxide slurry obtained in step 1 in sequence, thus obtaining dried cobalt oxyhydroxide;

Step 3: calcining the dried cobalt oxyhydroxide obtained in step 2 through a low temperature zone of 300° C. and a high temperature zone of 750° C. in sequence, thus obtaining battery-grade cobalt tetroxide with an average particle size of 3 μm.

Embodiment 2

2-4 μm battery-grade cobalt tetroxide provided by embodiment 2 of the present invention is prepared by the following steps:

Step 1: adding a cobalt sulfate solution with a cobalt ion concentration of 120 g/L and an alkaline solution with a concentration of 300 g/L by parallel flows at feed rates of 220 L/h and 50 L/h respectively to a reactor with pure water and an air flow, controlling pH value of a system at 10 by adjusting flow rate of the alkaline solution for coprecipitation reaction at a temperature of 65° C. and a stirring rate of 150 r/min, decreasing the pH value of the reaction system by 0.1 per hour and increasing flow rate of the cobalt salt solution by 15 L/h after the reaction solutions begin to overflow until the pH value of the reaction system is decreased to 9.2 and the flow rate of the cobalt salt solution is increased to 320 L/h, continuously monitoring particle size, and stopping feeding when D50 reaches a desired value, thus obtaining a cobalt oxyhydroxide slurry;

Step 2: aging, washing, de-ironing and drying the cobalt oxyhydroxide slurry obtained in step 1 in sequence, thus obtaining dried cobalt oxyhydroxide;

Step 3: calcining the dried cobalt oxyhydroxide obtained in step 2 through a low temperature zone of 200° C. and a high temperature zone of 700° C. in sequence, thus obtaining 2 μm battery-grade cobalt tetroxide.

Embodiment 3

2-4 μm battery-grade cobalt tetroxide provided by embodiment 3 of the present invention is prepared by the following steps:

Step 1: adding a cobalt sulfate solution with a cobalt ion concentration of 140 g/L and an alkaline solution with a concentration of 600 g/L by parallel flows at feed rates of 260 L/h and 150 L/h respectively to a reactor with pure water and an air flow, controlling pH value of a system at 11 by adjusting flow rate of the alkaline solution for coprecipitation reaction at a temperature of 80° C. and a stirring rate of 350 r/min, decreasing the pH value of the reaction system by 0.2 per hour and increasing flow rate of the cobalt salt solution by 25 L/h after the reaction solutions begin to overflow until the pH value of the reaction system is decreased to 9.8 and the flow rate of the cobalt salt solution is increased to 360 L/h, continuously monitoring particle size, and stopping feeding when D50 reaches a desired value, thus obtaining a cobalt oxyhydroxide slurry;

Step 2: aging, washing, de-ironing and drying the cobalt oxyhydroxide slurry obtained in step 1 in sequence, thus obtaining dried cobalt oxyhydroxide;

Step 3: calcining the dried cobalt oxyhydroxide obtained in step 2 through a low temperature zone of 400° C. and a high temperature zone of 800° C. in sequence, thus obtaining 4 μm battery-grade cobalt tetroxide.

Figure 2:
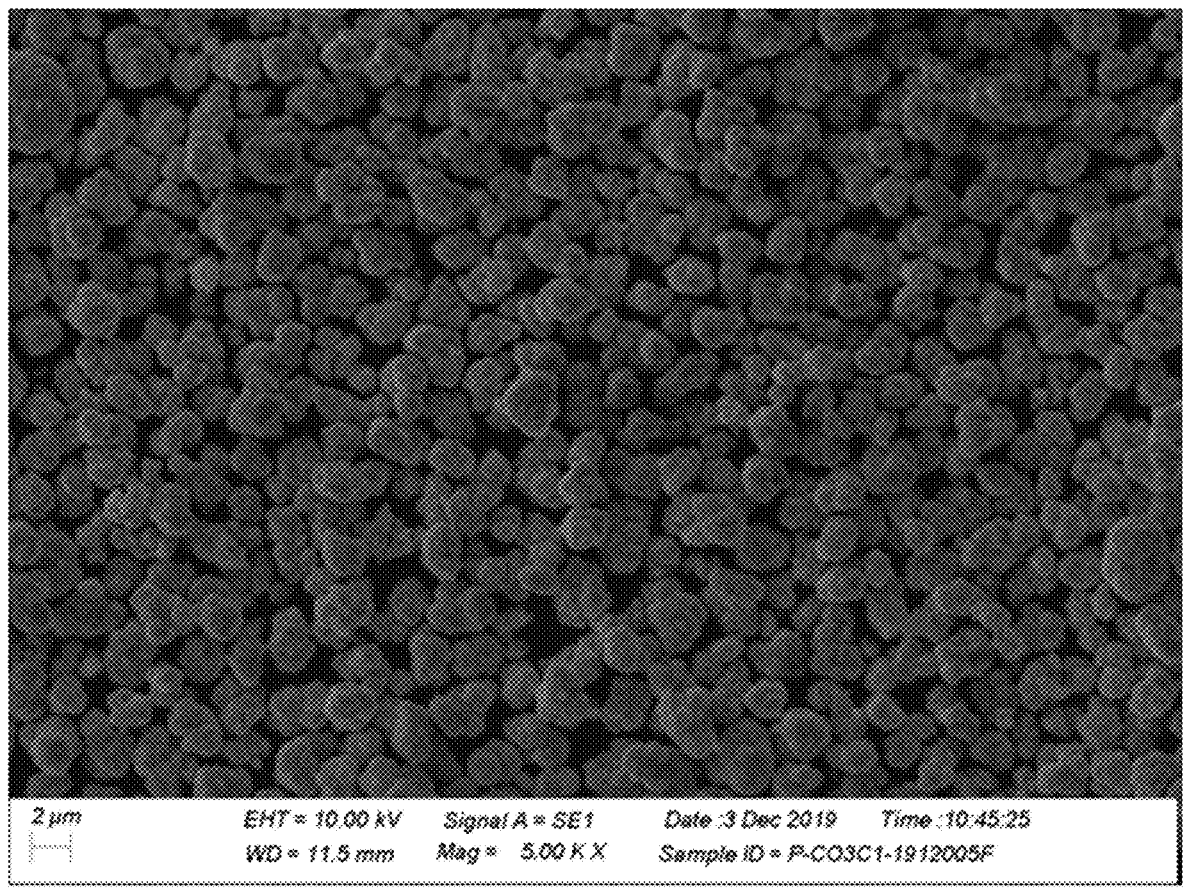
FIG. 2 is an SEM diagram of 2-4 μm battery-grade cobalt tetroxide obtained in embodiment 3 of the present invention.

In order to verify whether the 2-4 μm battery-grade cobalt tetroxide prepared by the present embodiment has the phenomenon of bursting, the battery-grade cobalt tetroxide obtained in embodiment 1 and embodiment 3 are tested by a scanning electron microscope (SEM), as shown in FIG. 1 and FIG. 2. It can be seen from FIG. 1 and FIG. 2 that the battery-grade cobalt tetroxide obtained by the present invention does not have the phenomenon of bursting on surface, and particles are compact.

The content of cobalt as an intermediate product in the process of preparing battery-grade cobalt tetroxide in embodiments 1-3 of the present invention is tested, the tap density and the specific surface area of battery-grade cobalt tetroxide prepared in embodiments 1-3 are tested, and the test results are shown as follows:

TABLE 1

|  | Content of cobalt as intermediate product/% | Tap density (g/cm$^3$) | Specific surface area (m$^2$/g) |
| --- | --- | --- | --- |
| Embodiment 1 | 70.01% | 2.41 | 4.34 |
| Embodiment 2 | 69.54% | 2.47 | 4.36 |
| Embodiment 3 | 69.89% | 2.40 | 4.64 |

It can be known from the data in Table 1 that the content of cobalt as an intermediate product in the process of preparing cobalt tetroxide is as high as 70.01%. Moreover, the tap density of the battery-grade cobalt tetroxide obtained by the present invention is as high as 2.47 g/cm$^3$, and the specific surface area is as high as 4.64 m$^2$/g.

In conclusion, through the method of preparing cobalt oxyhydroxide by reaction among sodium hydroxide, air and the cobalt salt solution first and then calcining the prepared cobalt oxyhydroxide, the present invention makes tap density of the 2-4 μm battery-grade cobalt tetroxide finally obtained is as high as 2.47 g/cm$^3$, and the specific surface area is as high as 4.64 m$^2$/g; in addition, water molecules are released in the process of sintering the cobalt oxyhydroxide in the method of the present invention, and compared with the rigid molecules of carbon dioxide released in the prior art, the water molecules are flexible molecules, are not easy to have a phenomenon of particle bursting, are more favorable for the sintering of cobalt tetroxide, and will not cause environmental pollution; at the same time, electric power consumption in the process of sintering can be greatly reduced.

The above is just one concrete embodiment of the present invention, but the protection scope of the present invention is not limited thereto. Any change or replacement contemplated easily by those skilled in the art familiar with the technical field within the technical scope disclosed by the present invention shall be covered within the protection scope of the present invention. Therefore, the protection scope of the present invention should be determined by the protection scope of the claims.

The invention claimed is:

1. A preparation method for 2-4 μm battery-grade cobalt tetroxide, comprising:

step 1: obtaining a cobalt oxyhydroxide slurry by raw materials consisting of a cobalt salt solution, an alkaline solution, and pure water; wherein the obtaining a cobalt oxyhydroxide slurry by raw materials comprises: adding the cobalt salt solution with a cobalt ion concentration of 120-140 g/L and the alkaline solution with a concentration of 300-600 g/L by parallel flows at certain feed rates respectively to a reactor with the pure water as a base solution and an air flow, controlling a pH value of a reaction system in the reactor at 10-11 by adjusting a flow rate of the alkaline solution for a coprecipitation reaction at a certain stirring rate, decreasing the pH value of the reaction system by 0.1-0.2 per hour and increasing a flow rate of the cobalt salt solution by 15-25 L/h after reaction solutions begin to overflow until the pH value of the reaction system is decreased to 9.2-9.8 and the flow rate of the cobalt salt solution is increased to 320-360 L/h, continuously monitoring a particle size of cobalt oxyhydroxide, and stopping feeding of the cobalt salt solution and the alkaline solution when cobalt oxyhydroxide D50 reaches 2-4 μm, thus the cobalt oxyhydroxide slurry is obtained;

step 2: aging, washing, de-ironing and drying the cobalt oxyhydroxide slurry obtained in step 1 in sequence, thus obtaining dried cobalt oxyhydroxide; and step 3: calcining the dried cobalt oxyhydroxide obtained in step 2 through a low temperature zone and a high temperature zone in sequence, thus obtaining 2-4 μm battery-grade cobalt tetroxide.

2. The preparation method for 2-4 μm battery-grade cobalt tetroxide as claimed in claim 1, wherein in step 1, the feed rate of the cobalt salt solution is 220-260 L/h; and the feed rate of the alkaline solution is 50-150 L/h.

3. The preparation method for 2-4 μm battery-grade cobalt tetroxide as claimed in claim 2, wherein in step 1, the stirring rate is 150-350 r/min.

4. The preparation method for 2-4 μm battery-grade cobalt tetroxide as claimed in claim 3, wherein in step 1, temperature of the coprecipitation reaction is 60-80° C.

5. The preparation method for 2-4 μm battery-grade cobalt tetroxide as claimed in claim 4, wherein in step 3, the low temperature zone is 200-400° C.; and the high temperature zone is 600-800° C.

6. The preparation method for 2-4 μm battery-grade cobalt tetroxide as claimed in claim 3, wherein in step 3, the low temperature zone is 200-400° C.; and the high temperature zone is 600-800° C.

7. The preparation method for 2-4 μm battery-grade cobalt tetroxide as claimed in claim 2, wherein in step 3, the low temperature zone is 200-400° C.; and the high temperature zone is 600-800° C.

8. The preparation method for 2-4 μm battery-grade cobalt tetroxide as claimed in claim 1, wherein in step 3, the low temperature zone is 200-400° C.; and the high temperature zone is 600-800° C.

9. The preparation method for 2-4 μm battery-grade cobalt tetroxide as claimed in claim 1, wherein cobalt salt of the cobalt salt solution is at least one of cobalt chloride, cobalt sulfate and cobalt nitrate.

10. The preparation method for 2-4 μm battery-grade cobalt tetroxide as claimed in claim 1, wherein step 1 comprises:

adding a cobalt sulfate solution as the cobalt salt solution with the cobalt ion concentration of 130 g/L and the alkaline solution with the concentration of 450 g/L by parallel flows at the feed rates of 240 L/h and 100 L/h respectively to the reactor with the pure water and the air flow, controlling the pH value of the reaction system in the reactor at 10.3 by adjusting the flow rate of the alkaline solution for the coprecipitation reaction at a temperature of 70° C. and the stirring rate of 200 r/min, decreasing the pH value of the reaction system by 0.1 per hour and increasing the flow rate of the cobalt salt solution by 20 L/h after the reaction solutions begin to overflow until the pH value of the reaction system is decreased to 9.5 and the flow rate of the cobalt salt solution is increased to 340 L/h, continuously monitoring the particle size of cobalt oxyhydroxide, and stopping feeding when the cobalt oxyhydroxide D50 reaches 3 μm, thus obtaining the cobalt oxyhydroxide slurry; and wherein step 3 comprises:

calcining the dried cobalt oxyhydroxide obtained in step 2 through the low temperature zone of 300° C. and the high temperature zone of 750° C. in sequence, thus obtaining battery-grade cobalt tetroxide with an average particle size of 3 μm.

11. The preparation method for 2-4 μm battery-grade cobalt tetroxide as claimed in claim 10, wherein a cobalt content of the dried cobalt oxyhydroxide is up to 70.01%, a tap density of the battery-grade cobalt tetroxide is 2.41 g/cm³, and a specific surface area of the battery-grade cobalt tetroxide is 4.34 m²/g.

12. The preparation method for 2-4 μm battery-grade cobalt tetroxide as claimed in claim 1, wherein step 1 comprises:

adding a cobalt sulfate solution as the cobalt salt solution with the cobalt ion concentration of 120 g/L and the alkaline solution with the concentration of 300 g/L by parallel flows at the feed rates of 220 L/h and 50 L/h respectively to the reactor with the pure water and the air flow, controlling the pH value of the reaction system in the reactor at 10 by adjusting the flow rate of the alkaline solution for the coprecipitation reaction at a temperature of 65° C. and the stirring rate of 150 r/min, decreasing the pH value of the reaction system by 0.1 per hour and increasing the flow rate of the cobalt salt solution by 15 L/h after the reaction solutions begin to overflow until the pH value of the reaction system is decreased to 9.2 and the flow rate of the cobalt salt solution is increased to 320 L/h, continuously monitoring the particle size of cobalt oxyhydroxide, and stopping feeding when the cobalt oxyhydroxide D50 reaches 2 μm, thus obtaining the cobalt oxyhydroxide slurry; and wherein step 3 comprises:

calcining the dried cobalt oxyhydroxide obtained in step 2 through the low temperature zone of 200° C. and the high temperature zone of 700° C. in sequence, thus obtaining battery-grade cobalt tetroxide with an average particle size of 3 μm.

13. The preparation method for 2-4 μm battery-grade cobalt tetroxide as claimed in claim 12, wherein a cobalt content of the dried cobalt oxyhydroxide is up to 69.54%, a tap density of the battery-grade cobalt tetroxide is 2.47 g/cm³, and a specific surface area of the battery-grade cobalt tetroxide is 4.36 m²/g.

14. The preparation method for 2-4 μm battery-grade cobalt tetroxide as claimed in claim 1, wherein step 1 comprises:

adding a cobalt sulfate solution as the cobalt salt solution with the cobalt ion concentration of 140 g/L and the alkaline solution with the concentration of 600 g/L by parallel flows at the feed rates of 260 L/h and 150 L/h respectively to the reactor with the pure water and the air flow, controlling the pH value of the reaction system in the reactor at 11 by adjusting the flow rate of the alkaline solution for the coprecipitation reaction at a temperature of 80° C. and the stirring rate of 350 r/min, decreasing the pH value of the reaction system by 0.2 per hour and increasing the flow rate of the cobalt salt solution by 25 L/h after the reaction solutions begin to overflow until the pH value of the reaction system is decreased to 9.8 and the flow rate of the cobalt salt solution is increased to 360 L/h, continuously monitoring the particle size of cobalt oxyhydroxide, and stopping feeding when the cobalt oxyhydroxide D50 reaches 4 μm, thus obtaining the cobalt oxyhydroxide slurry; and wherein step 3 comprises:

calcining the dried cobalt oxyhydroxide obtained in step 2 through the low temperature zone of 400° C. and the high temperature zone of 800° C. in sequence, thus obtaining battery-grade cobalt tetroxide with an average particle size of 4 μm.

15. The preparation method for 2-4 μm battery-grade cobalt tetroxide as claimed in claim 14, wherein a cobalt content of the dried cobalt oxyhydroxide is up to 69.89%, a tap density of the battery-grade cobalt tetroxide is 2.40 g/cm³, and a specific surface area of the battery-grade cobalt tetroxide is 4.64 m²/g.

* * * * *